United States Patent [19]

Kawano

[11] Patent Number: 4,611,749
[45] Date of Patent: Sep. 16, 1986

[54] METHOD OF AND SYSTEM FOR ASSEMBLING A PLURALITY OF PARTS INTO A UNIT

[75] Inventor: Saige Kawano, Hiroshima, Japan

[73] Assignee: Mazda Motor Corporation, Hiroshima, Japan

[21] Appl. No.: 674,766

[22] Filed: Nov. 26, 1984

[30] Foreign Application Priority Data

Nov. 28, 1983 [JP] Japan .................................. 58-225241
Nov. 28, 1983 [JP] Japan .................................. 58-225242
Nov. 28, 1983 [JP] Japan .................................. 58-225243
Nov. 30, 1983 [JP] Japan .................................. 58-226098

[51] Int. Cl.$^4$ ............................................. B23K 31/00
[52] U.S. Cl. ...................................... 228/176; 228/45; 228/47; 901/8
[58] Field of Search .................... 228/4.1, 7, 102, 45, 228/47, 49.1, 176; 219/125.1, 125.11; 901/6, 7, 8, 42; 414/744 A; 29/430

[56] References Cited

U.S. PATENT DOCUMENTS 4,425,858  1/1984  Hargett ............................... 901/6 X
4,503,507  3/1985  Takeda et al. ....................... 901/8 X

OTHER PUBLICATIONS

"Specialisation is the Watchword on Tokyo Robot Show Stands", by John Hartley, The Engineer, Nov. 3, 1977, p. 65.

Primary Examiner—Kuang Y. Lin
Attorney, Agent, or Firm—Gerald J. Ferguson, Jr.; Michael P. Hoffman; James E. Bryan

[57] ABSTRACT

A plurality of pivoted robots each having both a welding gun and a transferring member for transferring a part are arranged so that the swinging locus of each pivoted robot intersects with that of at least one of the other robots. A working station is provided at the intersection of the swinging loci and the pivoted robots accomplish welding on the corresponding part at the working station and transfer it to the next station.

13 Claims, 13 Drawing Figures

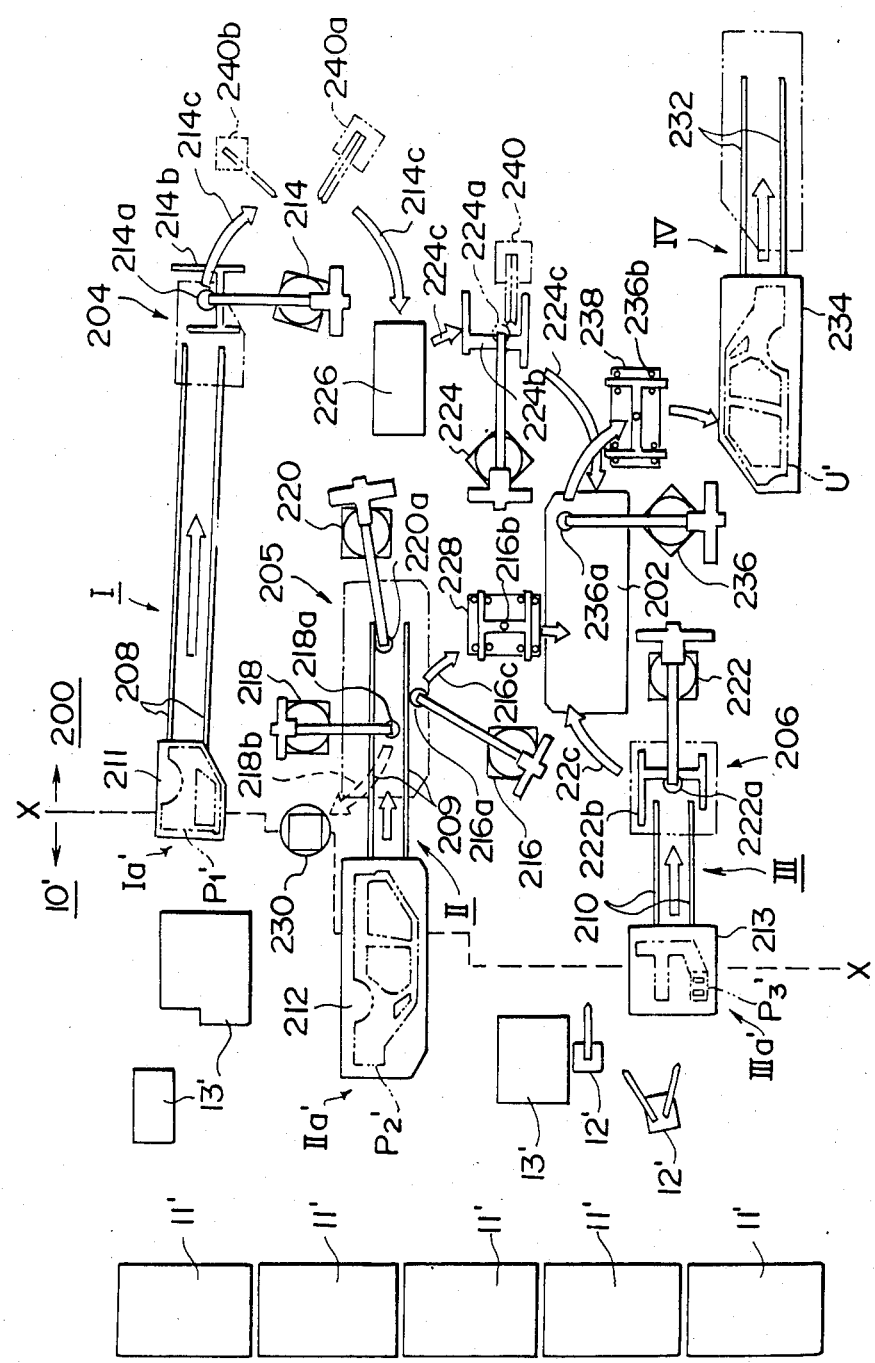

METHOD OF AND SYSTEM FOR ASSEMBLING A PLURALITY OF PARTS INTO A UNIT

BACKGROUND OF THE INVENTION

1. Field of the Invention

This invention relates to a method of assembling a plurality of parts, for example, in assembly of a vehicle body, and a system for carrying out the method.

2. Description of the Prior Art

In an assembly line for example one, for assembling by welding a plurality of panels into a unit such as a side portion of a vehicle body, there have been sometimes used robots. However, in the past, the robots have been disposed along a single conveyor line to carry out operations in place of workmen. In other words, in the past, robots have been used only for carrying out work that would otherwise be performed by workmen and the capability of the robot has not been fully used, though the number of workmen required for a given manufacturing step can be reduced. That is, robots have contributed to neither simplification of the manufacturing lines nor better use of the space in the plant.

As a method of assembling or integrating a plurality of parts such as various panels into a unit like a vehicle body, there has been known the so-called convergence assembly procedure in which main parts are separately assembled in different assembly lines and the assembled parts are converged to one station and assembled into a unit.

For example, a plurality of assembly lines A, B and C for assembling different parts are provided in parallel to each other as shown in FIG. 1. An integration station D is provided at the terminus C' of the assembly line C, and a conveyor line E for converging parts is provided to extend from the terminus A' of the assembly line A to the integration station D via the terminus B' of the assembly line B. This arrangement is disadvantageous in that the conveyor line E for conveying parts is necessary in addition to the assembly lines A, B and C, thereby complicating the arrangement, and that the layout of the assembly lines A, B and C is limited since, for instance, the termini A', B' and C' of the assembly lines A, B and C must be aligned with each other in order to connect them by way of the conveyor line E.

SUMMARY OF THE INVENTION

In view of the foregoing observations and description, the primary object of the present invention is to simplify the assembly lines of and make better use of the space in a plant using robots.

Another object of the present invention is to increase the freedom with which the line arrangement can be designed to utilize the space in the plant more efficiently.

A particular object of the present invention is to provide an improved method of integrating more than two parts respectively assembled in different lines, in which there is no need for a conveyor line for converging the parts, thereby simplifying the line arrangement and increasing the freedom of design of the line arrangement.

Such objects of the present invention can be accomplished by causing robots to accomplish both regular work such as welding on the parts and transfer of the same.

In accordance with one aspect of the present invention, there is provided a method of assembling a plurality of parts into a unit comprising steps of providing a plurality of pivoted robots each having both means for accomplishing its regular work on a part and means for transferring the part, arranging the pivoted robots so that the swinging locus of each pivoted robot intersects with that of at least one of the other pivoted robots, providing a working station at the intersection of the swinging loci, causing at least one of the pivoted robots whose swinging loci intersect to accomplish the regular work on the part at the working station, and causing one of the pivoted robots whose swinging loci intersect to transfer the part to the next station.

In accordance with another aspect of the present invention, more than two, typically three, parts assembled in different assembly lines and the parts are converged to an integration station to be assembled or integrated into a unit. The final work on each part on the corresponding assembly line is accomplished by a pivoted robot provided with both means for accomplishing the final work and means for transferring the completed part. (Such a robot will be referred to as a final-work robot, hereinbelow.) Each final-work robot is adapted to swing between two spaced stations to transfer the part therebetween. The integrating station is positioned in the turning ranges or the transferring ranges of both the final-work robots for two predetermined assembly lines out of said assembly lines. The parts assembled in the predetermined two lines are transferred to the integrating station by the respective final-work robots. Between the integrating station and respective one ends of the transferring ranges of the final-work robots for the other assembly lines are disposed relay robots for transferring the parts transferred to said one ends by the final-work robots to the integrating station.

BRIEF DESCRIPTION OF THE DRAWINGS

FIG. 13 is a schematic plan view of a concrete system for carrying out the embodiment illustrated in conjunction with FIGS. 11 and 12.

DESCRIPTION OF THE PREFERRED EMBODIMENTS

Figure 1:
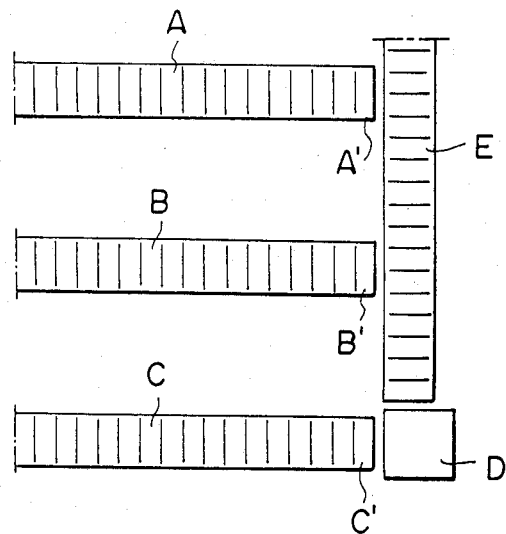
FIG. 1 is a schematic view showing a typical conventional arrangement of assembly lines for assembling a plurality of parts into a unit.
Figure 2:
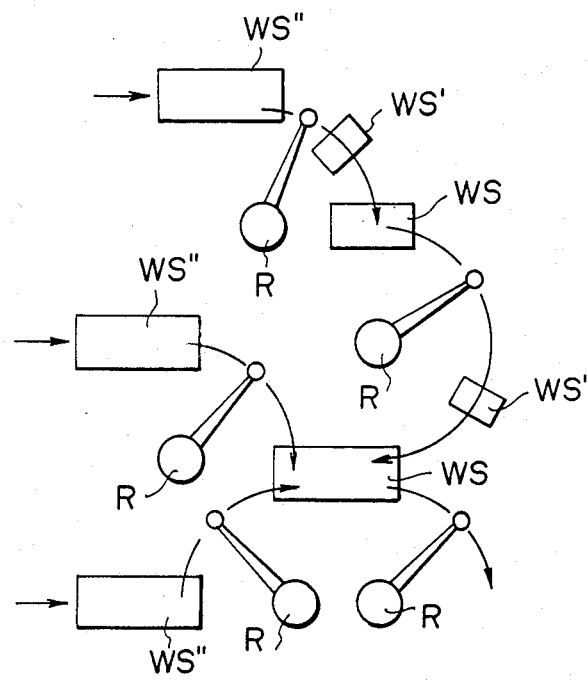
FIG. 2 is a schematic view showing the concept of an embodiment of the present invention.

FIG. 2 is a schematic view showing the concept of an embodiment of the present invention. As shown in FIG. 2, in accordance with one aspect of the present invention, a plurality of pivoted robots R having both working means and transferring means are arranged according to the order of assembling parts so that the swinging loci or the swinging paths of the pivoted robots intersect with each other. A working station WS is provided at each intersection of the swinging paths of the robots R. At least one of the robots whose swinging paths intersect at the working station WS is caused to work on the corresponding part or parts on the working station WS and to transfer the part or parts to the next working station WS. With this arrangement, conveyor lines used in conventional assembly lines can be omitted. Since the space occupied by the robots is substantially smaller than that occupied by the conventional conveyor lines, the space in the plant can be utilized more efficiently. Further, in accordance with the present invention in which the parts are transferred by the pivoted robots, the direction of the assembly lines can be selected relatively freely as compared with the prior art in which the parts are transferred by conveyor lines. Therefore, small spaces and/or spaces of an irregular shape which could not be utilized in the past can be utilized in accordance with the present invention.

If desired, working stations may be provided in addition along the transferring paths of the pivoted robots R between the ends of the transferring path or at the intersection of the transferring path of the pivoted robot R and other transfer means as indicated at WS' and WS", respectively, in FIG. 2.

The transferring means are means by way of which the robot grips the part to be transferred and may be either of the type fixedly mounted on the robot or of the type normally placed away from the robot and detachably attached to the robot when the robot is to accomplish transfer of a part.

The term "intersect" or "intersection" used in conjunction with the transferring paths or the swinging loci of the pivoted robots should be broadly interpreted to include cases in which the transferring paths of the pivoted robots only approach each other to permit transfer of the parts therebetween.

Now a concrete system for carrying out a method of assembling a plurality of parts into a unit in accordance with an embodiment of the present invention will be described in detail with reference to FIGS. 3 and 4.

Figure 3:
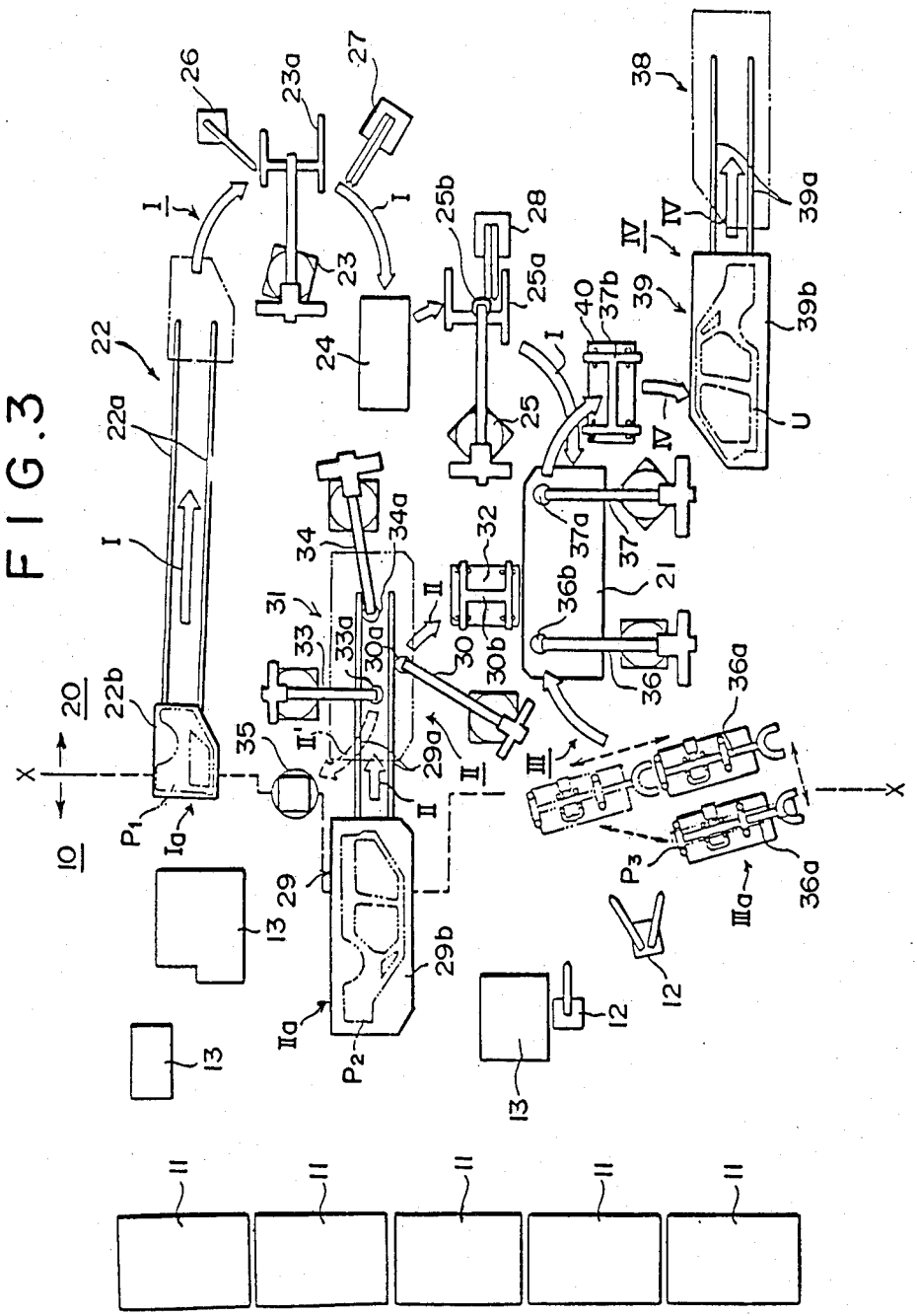
FIG. 3 is a schematic plan view of a concrete system for carrying out a method in accordance with an embodiment of the present invention.
Figure 4:
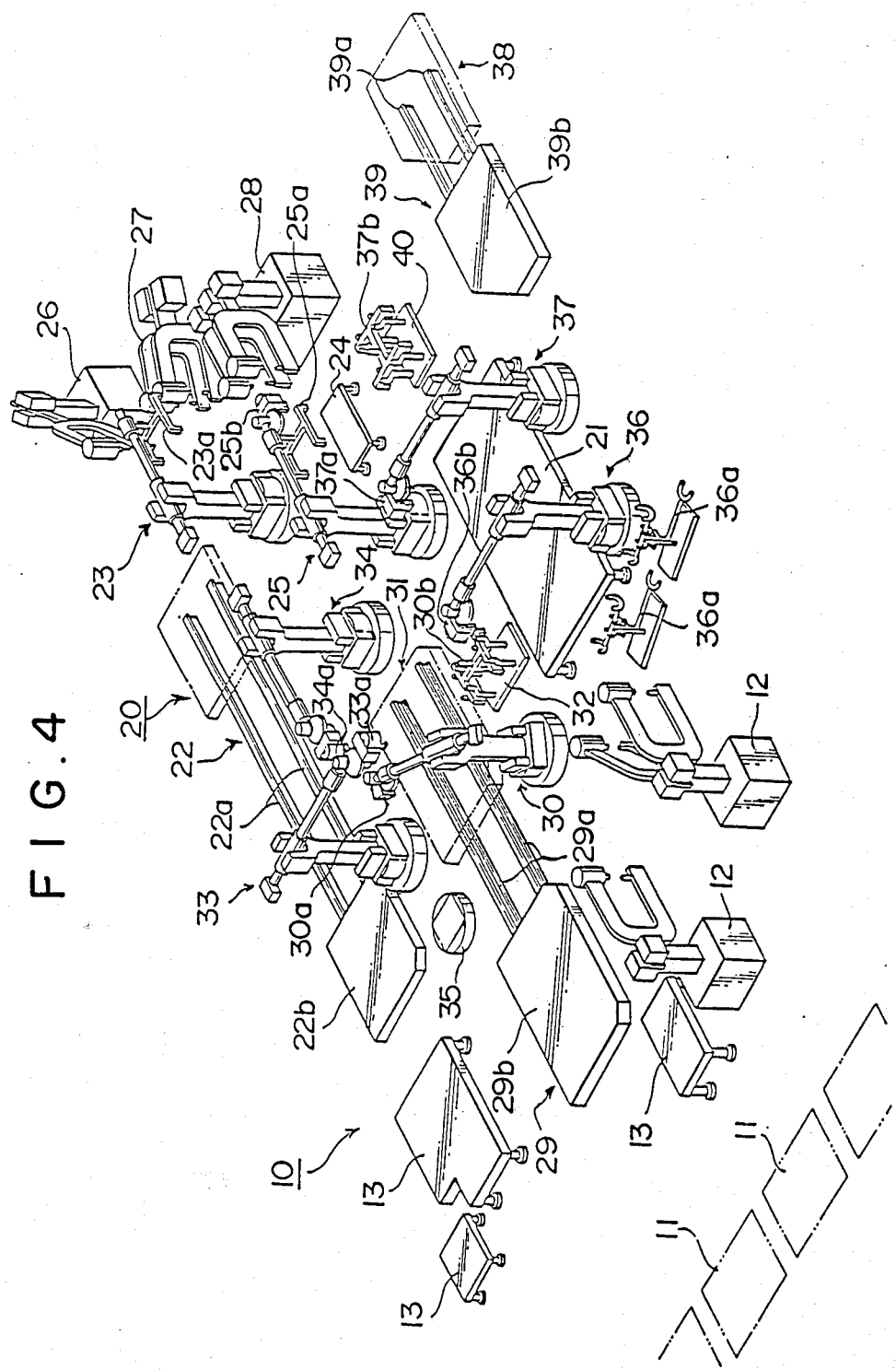
FIG. 4 is a schematic perspective view of the system shown in FIG. 3.

In the system shown in FIGS. 3 and 4, a rear fender, a quarter panel and a front pillar inner panel are respectively assembled in first to third assembly lines I, II and III and are converged to an integration station 21 to be integrated into a unit forming a side portion of a vehicle body. In FIGS. 3 and 4, reference numerals 10 and 20 respectively denote a human working area and an automated working area divided by an imaginary line X—X. On one side of the human working area 10 are provided parts feeding stations 11 in which various parts for assembling the rear fender, quarter panel, and front pillar inner panel are stored. First to third parts delivering stations Ia, IIa and IIIa are provided along the line X-X at the starting ends of the respective assembly lines I to III. A plurality of stationary welding machines 12 and a plurality of working stations 13 are provided in the human working area 10.

Said assembly lines I to III are disposed in the automated working area 20 and extend between the respective parts delivering stations Ia, IIa and IIIa and the integration station 21. In the automated working region 20 is further provided an output line IV for carrying out the unit integrated on the integration station 21.

The first assembly line I comprises a conveyor 22 consisting of a pair of rails 22a and a carriage 22b adapted to move on the rails 22a, a first pivoted robot 23 which is provided with a transferring member 23a on its arm and is adapted to receive a part from the conveyor 22 and transfer it to a relay station 24, and a second pivoted robot 25 which is provided with a transferring member 25a on its arm and is adapted to transfer the part from the relay station 24 to the integration station 21. The first and second pivoted robots 23 and 25 accomplish, in addition to transfer of the part, welding on the part using stationary welding machines 26, 27 and 28, the former two welding machines 26 and 27 being disposed along the transferring path of the first pivoted robot 23 and the last welding machine 28 being disposed along the transferring path of the second pivoted robot 25. Further, the second pivoted robot 25 is provided with a welding gun 25b at the free end of its arm and accomplishes welding on the part at the relay station 24 using the welding gun 25b.

The second assembly line II comprises a conveyor 29 consisting of a pair of rails 29a and a carriage 29b adapted to move on the rails 29a, and a third pivoted robot 30 which is provided with a transferring member 30b on its arm and is adapted to receive a part from the conveyor 29 and transfer it to the integration station 21. An intermediate assembly station 31 is provided at the intersection of the transferring paths of the conveyor 29 and the third pivoted robot 30. The third pivoted robot 30 is further provided with a welding gun 30a at the free end of its arm and accomplishes welding on the part at the intermediate assembly station 31 using the welding gun 30a. The transferring member 30b of the third pivoted robot 30 is detachably mounted on the robot 30 and is placed on a temporarily placing table 32 while the robot 30 accomplishes welding on the intermediate assembly station 31. Fourth and fifth pivoted robots 33 and 34 which are provided with welding guns 33a and 34a on their respective free ends are disposed to accomplish welding at the intermediate assembly station 31 together with the third pivoted robot 30. In this particular embodiment, the fourth pivoted robot 33 is swung to a working station 35 and accomplishes welding at the working station 35 on a part separately fed to the working station 35 from the human working area 10.

Said third assembly line III comprises a sixth pivoted robot 36 which transfers parts from the third parts delivering station IIIa to the integration station 21. As will be described in detail hereinbelow, a pair of transferring members 36a are disposed at the third parts delivering station IIIa. While one of the transferring members 36a is attached to the sixth pivoted robot 36 and is transferred to the integration station 21 together with the parts held thereby, a plurality of parts are manually loaded on the other transferring member 36a. The sixth pivoted robot 36 is further provided with a welding gun 36b at the free end of its arm and accomplishes welding on the integration station 21 which is provided at the intersection of the transferring paths of the second, third and sixth pivoted robots 25, 30 and 36. Further, a seventh pivoted robot 37 provided with a welding gun 37a at the free end of its arm is disposed to accomplish welding at the integration station 21.

Said output line IV comprises the seventh pivoted robot 37 and a conveyor 39 consisting of a pair of rails 39a and a carriage 39b adapted to move on the rails 39. The conveyor 39 receives the integrated assembly from the seventh pivoted robot 37 and transfers it to an output station 38. The seventh pivoted robot 37 transfers the integrated assembly by use of a transferring member 37b which is detachably mounted thereon and is placed on a temporarily placing table 40 while the seventh robot 37 accomplishes welding at the integration station 21.

In this embodiment, a rear fender panel, a quarter panel, a front pillar inner panel are used as the main parts and are integrated together and with sub parts such as a wheel house, a side sill, a center pillar, a roof rail and the like into a side portion of a vehicle body. The parts are stored in the parts feeding station 11 in the human working area 10 and are taken out therefrom to be manually assembled into first and second primary assemblies P1 and P2 on the working stations 13 or by use of the welding machines 12, or separately loaded on the transferring member 36a of the sixth pivoted robot 36 as a group of parts P3 (to be described in detail hereinbelow.) The first primary assembly P1 is placed on the carriage 22b of the first assembly line I at the first parts delivering station Ia and is transferred to the integration station 21 by the conveyor 22, the first pivoted robot 23 and the second pivoted robot 25. While the first primary assembly P1 is being transferred to the integration station 21, the stationary welding machines 26, 27 and 28 work on the first primary assembly P1 and the second pivoted robot 25 accomplishes welding on the first primary assembly P1 at the relay station 24 provided at the intersection of the transferring paths of the first and second pivoted robots 23 and 25.

The second primary assembly P2 is placed on the carriage 29b of the second assembly line II and is transferred to the intermediate assembly station 31 by means of the conveyor 29 to be subjected to welding by the third, fourth and fifth pivoted robots 30, 33 and 34. Thereafter, the second primary assembly P2 is transferred to the integration station 21 by the third pivoted robot 30. When transferring the second primary assembly P2, the third pivoted robot 30 first moves to the temporarily placing table 32 and brings the transferring member 30b together therewith to the intermediate assembly station 31. Then the third pivoted robot 30 grips the second primary assembly P2 by way of the transferring member 30b and transfers it to the integration station 21. Then the third pivoted robot 30 returns to the intermediate assembly station 31, leaving the second primary assembly P2 at the integration station 21 and the transferring member 30b on the temporarily placing table 32 on its way to the intermediate assembly station 31. While the third pivoted robot 30 transfers the second primary assembly P2 to the integration station 21, the fourth pivoted robot 33 accomplish welding at the working station 35 on parts manually fed to the working station 35 disposed on the boundary between the human working area 10 and the automated working area 20. The parts are incorporated into one of the main parts in the human working area 10.

The group of parts P3 loaded on one of the transferring member 36a of the sixth pivoted robot 36 is transferred to the integration station 21 by the sixth pivoted robot 36 together with the transferring member 36a.

The sixth pivoted robot 36 returns to the third parts delivering station IIIa with the empty transferring member 36a. Then the sixth pivoted robot 36 transfers to the integration station the other transferring member 36a which has been loaded with another group of parts P3 while the sixth pivoted robot 36 transfers said one transferring member 36a to the integration station 21 and accomplishes predetermined work at the integration station 21.

The first primary assembly P1, the second primary assembly P2 and the group of parts P3 are thus converged to the integration station 21 after being subjected to various processes on the way to the integration station 21. The first and second assemblies P1 and P2, and the group of parts P3 are assembled or integrated into a unit U, i.e., a side portion of a vehicle body in this particular embodiment, by the sixth and seventh pivoted robots 36 and 37. If desired, the second and third pivoted robots 25 and 30 having the welding guns 25a and 30a may be arranged to accomplish welding at the integration station 21. Then the unit U is placed on the carriage 39b of the conveyor 39 of the output line IV by the seventh pivoted robot 37 and is transferred to the output station 38 by the conveyor 39.

Now an example of a robot which can be employed as the sixth pivoted robot 36 for transferring the group of parts P3 to the integration station 21 will be described in detail together with an example of the transferring member 36a with reference to FIGS. 5 to 10.

Figure 5:
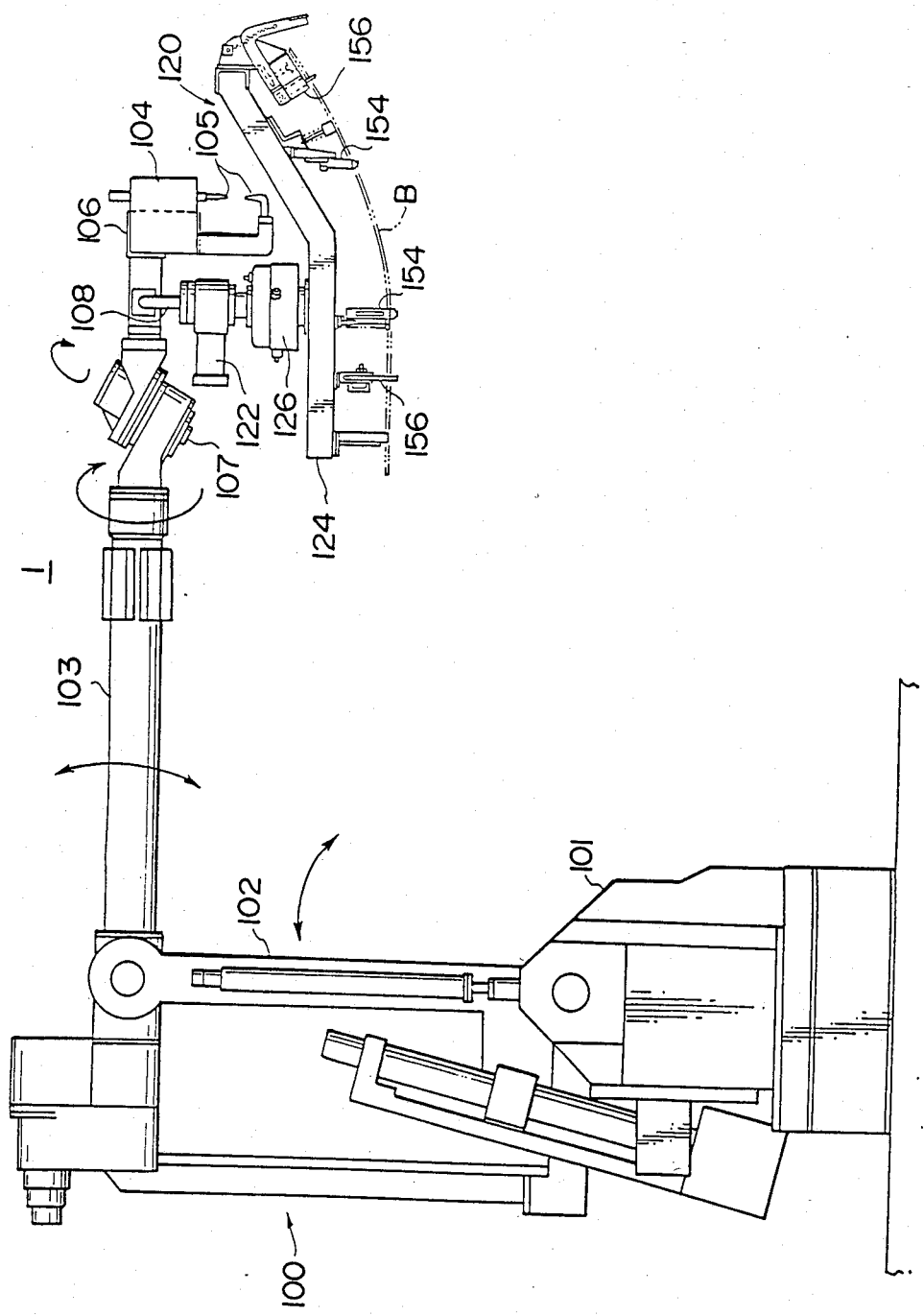
FIG. 5 is an enlarged side view of a robot and a parts holder employed in the system shown in FIGS. 3 and 4.

In FIG. 5, the pivoted robot 100 of this example comprises a base pedestal 101, a supporting post 102 mounted on the base pedestal 101 for rotation about the longitudinal axis thereof and for pivotal movement in a vertical plane, and a pivoted arm 103 mounted on the top of the supporting post 102 for rotation about its own central axis and for vertical pivotal movement. On the free end of the pivoted arm 103 is mounted a welding gun 104 comprising a pair of welding chips 105 connected to a feeder transformer 106. The pivoted arm 103 is provided, at an intermediate portion, with an inclined shaft 107 the central axis of which is inclined with respect to the central axis of the pivoted arm 103, thereby providing increased freedom in movement to the welding gun 104. On the pivoted arm 103 is fixedly mounted, near the welding gun 104, a joint member 108 for detachably connecting a transferring member 120. In a preferred embodiment of the present invention, the transferring member 120 is used for transferring the part by the robot and at the same time for locating the part with respect to the integration station 21 thereby locating the parts to be integrated at the integration station 21 with respect to each other. Therefore, the transferring member 120 will be sometimes referred to as a "parts holder".

Figure 6:
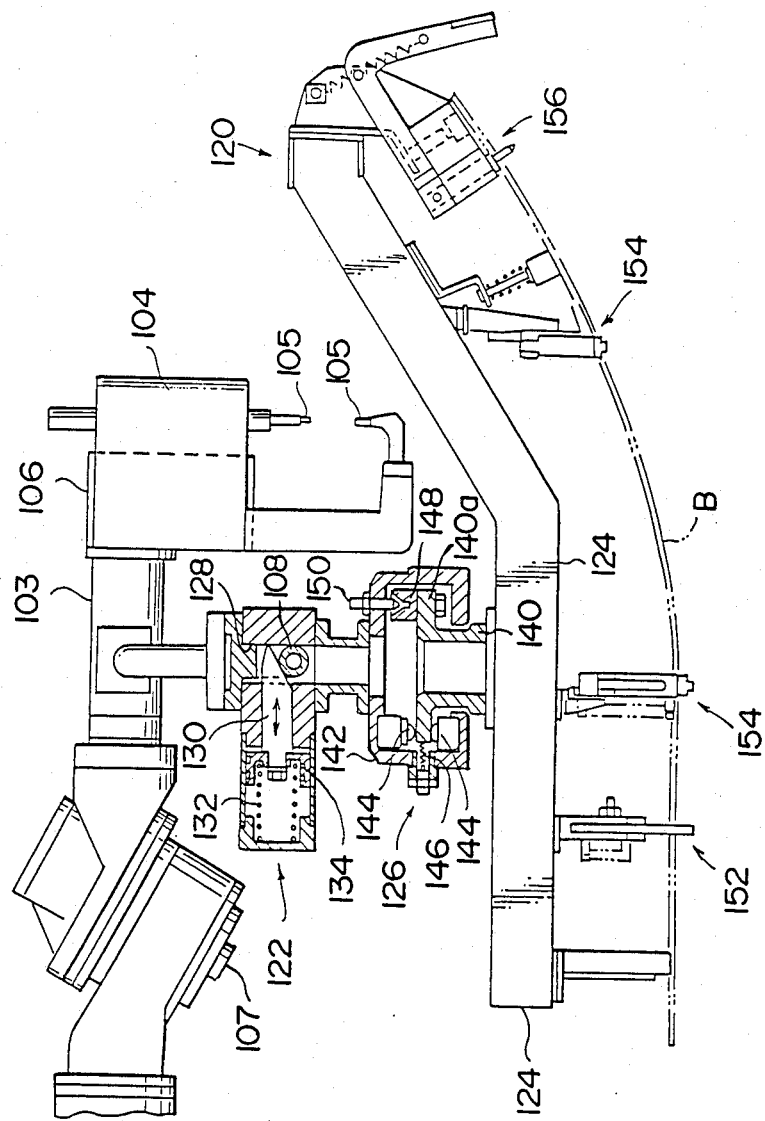
FIG. 6 is an enlarged fragmentary side view of the same.

The parts holder 120 includes a chucking mechanism 122 adapted to be detachably coupled with the joint member 108 of the robot 100. The chucking mechanism 122 is mounted on a frame 124 by way of a floating unit 126. As shown in FIG. 6, the chucking mechanism 122 comprising a hole 128 adapted to receive the joint member 108 and an engaging piece 130 which is slidable between an operative position in which it is projected into the hole 128 and a retracted position in which it is retracted away from the same. The engaging piece 130 is urged toward the operative position by a spring 132 and is adapted to be moved to the retracted position when an air cylinder 134 is actuated. That is, when pressurized air is supplied to the air cylinder 134, the engaging piece 130 is retracted from the hole 128 to permit insertion and extraction of the joint member 108 into and from the hole 128, and otherwise the engaging piece 130 projects into the hole 128 under the force of the spring 132 to prevent extraction of the joint member 108 if the joint member 108 has been inserted into the hole 128 and to prevent insertion of the joint member 108 if the joint member 108 has not been thereinto. That is, the parts holder 120 is coupled to the pivoted arm 103 by inserting the joint member 108 into the hole 128 with the air cylinder 134 being provided with pressurized air to retract the engaging piece 130 and by stopping the feed of pressurized air to the air cylinder 134 after insertion of the joint member 108 into the hole 128. The floating unit 126 comprises a flange member 140 which has a flange 140a on the top thereof and is fixedly mounted on the frame 124 at the lower end thereof. The flange member 140 is received in a holder 142 and is held therein in a floating state by way of a plurality of rollers 144 abutting against opposite sides of the flange 140a and a plurality of springs 146 acting on the periphery of the flange 140a, the movement of the flange member 140 with respect to the holder 142 being limited by abutment between a restricting piece 148 fixed to the flange member 140 and a pin 150 fixed to the holder 142. That is, the frame 124 is movable with respect to the pivoted arm 103 of the robot 100 to some extent to accommodate for any error of the robot 100 in locating the parts holder 120 with respect to the integration station 21.

Figure 7:
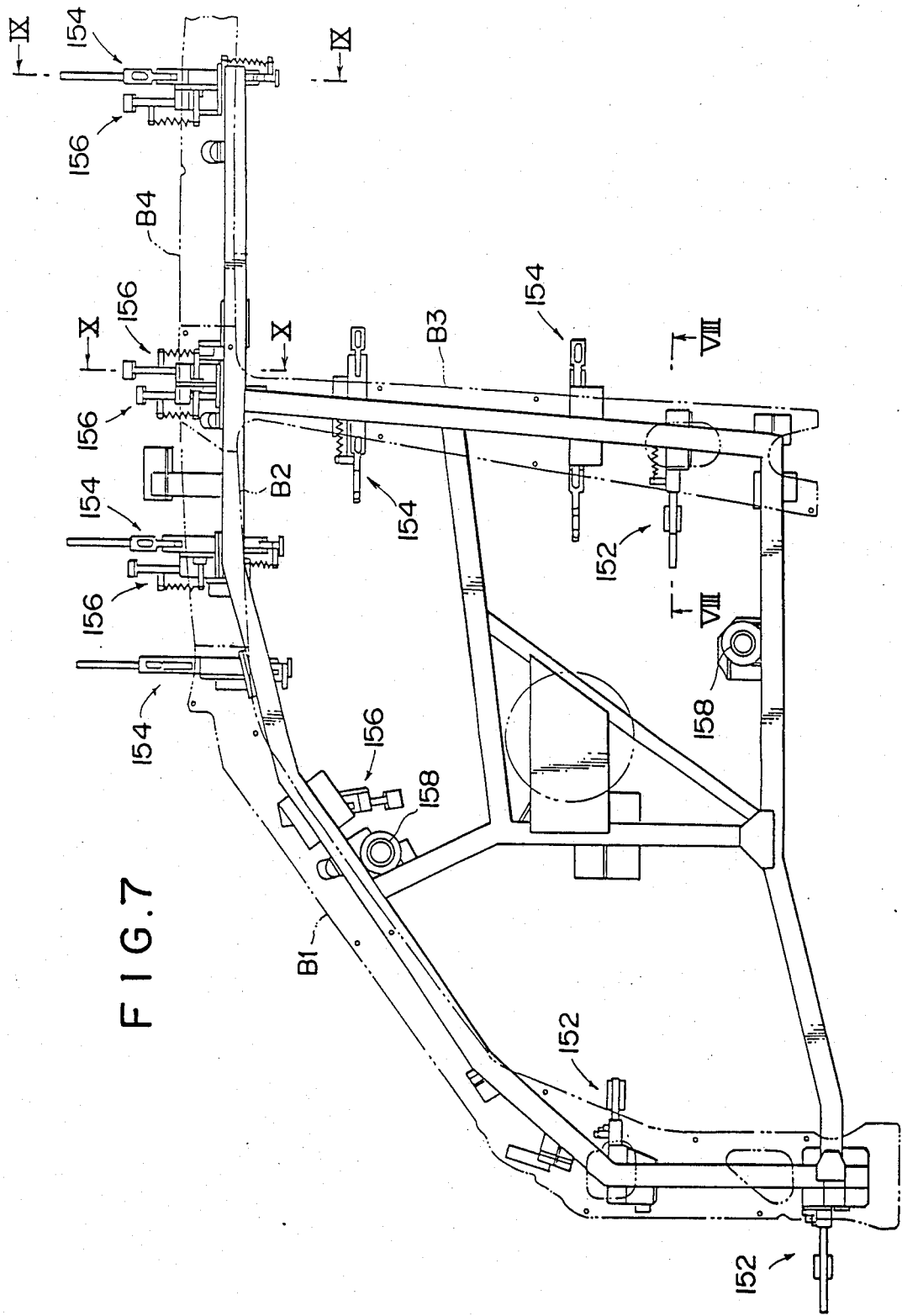
FIG. 7 is an enlarged plan view of the parts holder.
Figure 8:
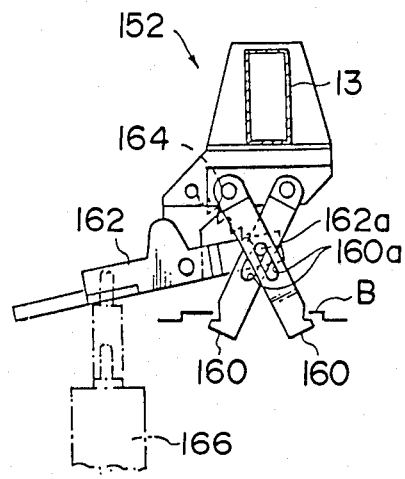
FIG. 8 is a fragmentary cross-sectional view taken along line VIII—VIII in FIG. 7.
Figure 9:
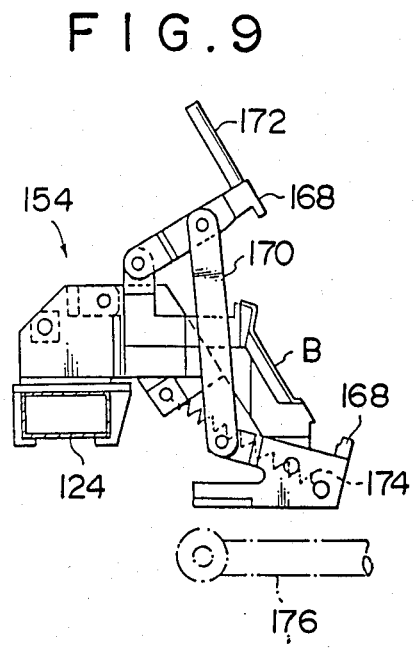
FIG. 9 is a fragmentary cross-sectional view taken along line IX—IX in FIG. 7.
Figure 10:
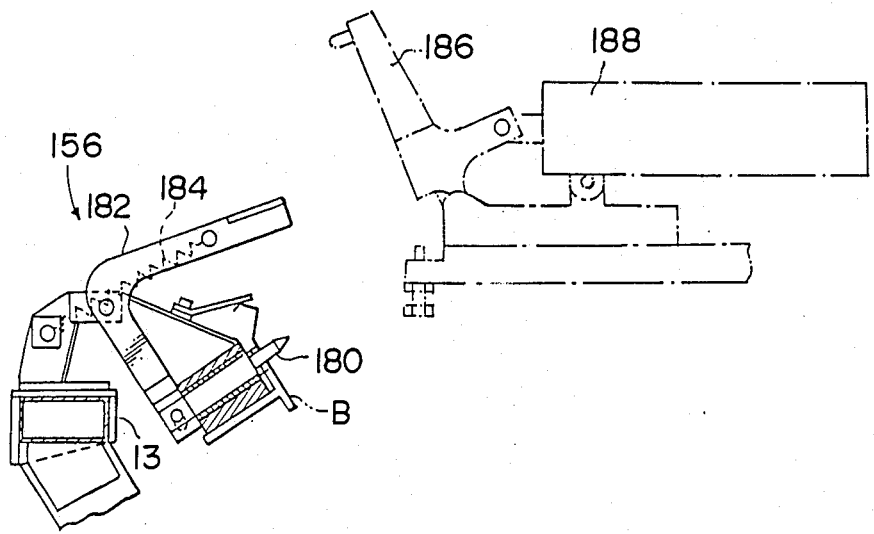
FIG. 10 is a fragmentary cross-sectional view taken along line X—X in FIG. 7.

The frame 124 is designed to hold four parts B (B1 to B4) and is provided with a plurality of first and second clamp mechanisms 152 and 154 for gripping the corresponding part B (B1 to B4) and with a plurality of locating mechanisms 156 for locating the corresponding parts (B1 to B4) with respect to the parts holder 120 as shown in FIG. 7. The frame 124 is further provided with a plurality of positioning holes 158 for locating the frame 124 with respect to the integration station 21. The first clamp mechanism 152 has a pair of crossed clamp members 160 which are adapted to be inserted into an opening of the corresponding part B and are provided with respective elongated openings 160a. Into the elongated openings 160a of both the clamp members 160 is inserted a pin 162a projecting from a pivoted lever 162 so that the clamp members 160 are open and closed in response to pivotal movement of the pivoted lever 162. The pivoted lever 162 is urged by a spring 164 toward a clamping position in which the pair of clamping members 160 are opened to grip the part B, and is swung to a releasing position, by an actuator 166 provided on the integration station 21, in which the pair of clamping members 160 are closed to release the part B. The second clamp mechanism 154 comprises a pair of clamping members 168 pivotally mounted on the frame 124 and connected with each other by way of a link 170 to be opened and closed in response to each other as shown in FIG. 9. An actuating lever 172 is mounted on one of the clamping members 168 and one end of a spring 174, the other end of which is fixed, is connected to the other clamping members 168. The spring 174 urges the clamping members 168 toward a closed or clamping position in which they are swung inwardly to press the upper and lower edges of the part B against the frame 124 when the clamping members 168 are swung inwardly over a certain angle and urges the clamping members 168 toward an open or releasing position in which they are swung outwardly to release the part B when the clamping members 168 are swung outwardly over the certain angle. A control rod 176 is provided on the integration station 21 which acts on the actuating lever 172 to move the clamping members 168 toward the releasing position shown in FIG. 9. Said locating mechanism 156 is arranged to insert a locator pin 180 into an opening formed in the part B as shown in FIG. 10. That is, the locating mechanism 156 has a bell-crank 182 and the locator pin 180 is connected to one end of the bell-crank 182. To the other end of the bell-crank 182 is connected an end of a spring 184 to urge bell-crank 182 into a position in which the locator pin 180 projects toward the outside as shown in FIG. 10. A releasing lever 186 is disposed on the integration station 21 to be swung back and forth by a cylinder 188. When the part B is attached to the parts holder 120, the locator pin 180 is caused to project, and when the parts B is to be released from the parts holder 120, the releasing lever 186 is caused to push the locator pin 180 away from the opening of the part B.

The parts B are manually loaded on the parts holder 120 at the parts delivering station IIIa by way of the clamp mechanisms 152 and 154 and the locating mechanisms 156. The robot 100 moves to the third parts delivering station IIIa and brings the parts holder 120 by way of the engagement between the joint member 108 and the chucking mechanism 122 to the integration station 21. Then the parts holder 120 is placed in a predetermined position with respect to the integration station 21 under the guidance of the positioning holes 158 of the frame 124 and guide pins on the station 21, whereby the parts B are positioned on the integration station 21 in predetermined positions with respect to the part which has been located on the integration station 21 and into which the parts B are to be incorporated. Thereafter, the chucking mechanism 122 is disengaged from the joint member 108 and the robot 100 accomplishes predetermined welding at the integration station 21. Then, the chucking mechanism 120 is engaged with the joint portion 108 again and is returned to the third parts delivering station IIIa by the robot 100 with the clamp mechanisms 152, 154 and the locating mechanisms 156 being released. Thus, as will be apparent to those skilled in the art, a plurality of parts can be incorporated into the main parts without tack welding.

Figure 11:
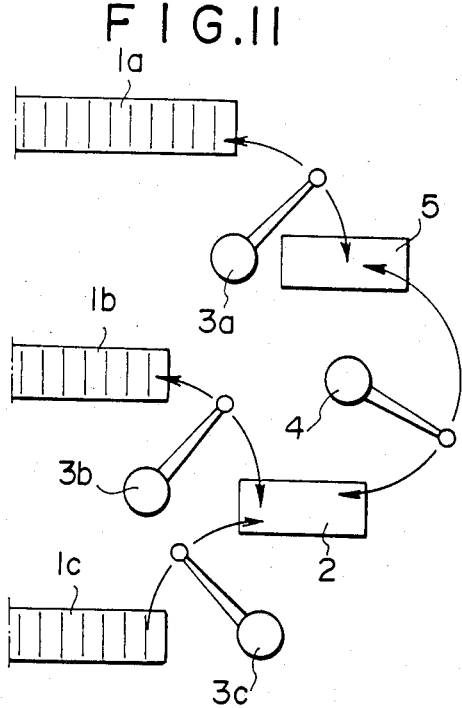
FIG. 11 is a schematic view showing the concept of another embodiment of the present invention.
Figure 12:
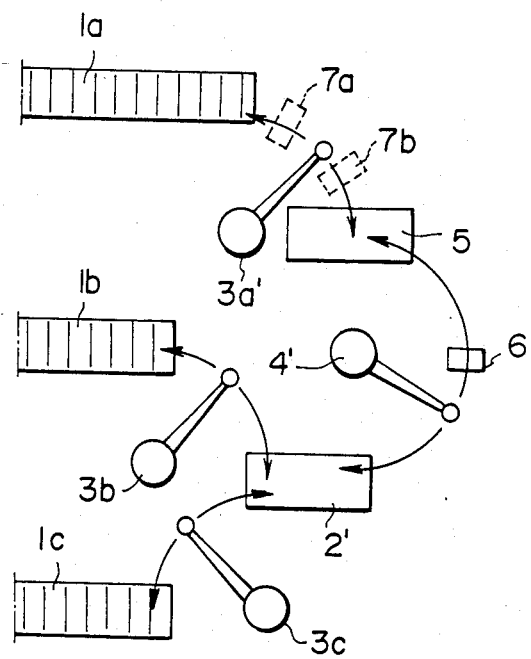
FIG. 12 is a view similar to FIG. 11 but showing a modification of the embodiment of FIG. 11.

FIG. 11 is a schematic view showing the concept of another embodiment of the present invention, and FIG. 12 is a view similar to FIG. 11 but showing a modification of the embodiment of FIG. 11.

In FIG. 11, first to third parts (not shown) are respectively assembled in first to third assembly lines 1a, 1b and 1c. First to third pivoted final-work robots 3a to 3c are respectively disposed near the terminating ends of the first to third assembly lines 1a to 1c. Though not shown, each final-work robot (The pivoted final-work robot will be simply referred to as the "final-work robot", hereinbelow.) is provided with a tool for accomplishing the final or last work to be done on the part in the line and means for transferring the part. An integration station 2 at which the parts assembled in the respective assembly lines 1a to 1c are integrated into a unit is positioned in the transferring ranges of both the second and third final-work robot 3b and 3c. The second and third parts are directly transferred to the integration station 2 by the final-work robot 3b and 3c. The first part is once transferred to a relay station 5 at one end of the transferring range of the first final-work robot 1a by the same, and then transferred to the integration station 2 from the relay station 5 by means of a relay robot 4.

With this arrangement, the converging conveyor line conventionally needed to transfer the parts to the integration station can be omitted. Since the transferring paths of the robots can be set relatively freely, freedom in layout is increased, whereby the space in the plant can be utilized more efficiently.

In the embodiment shown in FIG. 12 which is a modification of the embodiment shown in FIG. 11, a working station 6 is disposed along the transfer path of a relay robot 4' and the relay robot 4' is provided with a tool for accomplishing a predetermined work on the first part before transferring it to the integrating station 2. Instead of providing the working station 6, the relay robot 4' may be arranged to accomplish the predetermined work at the relay station 5. If desired, additional working stations 7a and 7b may be provided along the transferring path of the first final-work robot 3a' as shown by the dotted lines in FIG. 12. This embodiment is advantageous over that shown in FIG. 11 in that the first assembly line can be shortened since a part of the work which must be done on the first part in the line can be done by the relay robot 4' outside the line, i.e., at the working station 6.

Now a concrete embodiment in accordance with the concept illustrated in FIGS. 11 and 12 will described in detail with reference to FIG. 13.

In the embodiment shown in FIG. 13, a rear fender, a quarter panel and a front pillar inner panel are respectively assembled in first to third assembly lines I, II and III, and are converged to an integration station 202 to be integrated into a unit forming a side portion of a vehicle body. In FIG. 13, reference numerals 10' and 200 respectively denote a human working region and an automated working region divided by an imaginary line X—X. On one side of the human working region 10' are provided parts feeding stations 11' in which various parts for assembling the rear fender, quarter panel and front pillar inner are stored. First to third parts delivering stations Ia', IIa' and IIIa' are provided along the line X—X at the starting ends of the respective assembly lines I to III. A plurality of working stations 13' and a plurality of stationary welding machines 12' are provided in the human working region 10'.

Said assembly lines I to III are disposed in the automated working region 200 and have final working station 204, 205 and 206 at the respective terminating ends opposite to the parts delivering stations Ia', IIa' and IIIa'. The assembly lines I to III respectively comprise a pair of rails 208, 209 and 210, and carriages 211, 212 and 213 moving on the corresponding rails.

At the final working station 204 of the first assembly line I is disposed a first final-work robot 214 of pivoted type to which is alloted the work to be done last in the first assembly line I. In this particular embodiment, the last or final work to be done by the first final-work robot 214 is welding and the first final-work robot 214 is provided with a welding gun 214a on its arm. At the final working station 205 of the second assembly line II are disposed pivoted type final-work robots (second to fourth) 216, 218 and 220 which are respectively provided with welding guns 216a, 218a and 220a and to which is alloted the work to be done last in the second assembly line II. At the final working station 206 of the third assembly line III is disposed a fifth final-work robot 222 of pivoted type which is provided with a welding gun 222a and to which is alloted the work to be done last in the third assembly line III.

The first final-work robot 214, the second final-work robot 216 and the fifth final-work robot 222 are respectively provided with parts holders 214b, 216b and 222b in addition to the welding guns 214a, 216a and 222a, and are adapted to transfer the parts assembled in the respective assembly lines I, II and III to the next manufacturing stages. That is, the parts assembled in the second and third assembly lines II and III are directly transferred to the integration station 202 by the second and fifth final-work robots 216 and 222 which are arranged to accomplish both welding on the corresponding parts and transfer of the same and the transferring paths of which are respectively shown by arrows 216c and 222c, and the part assembled in the first assembly station I is transferred to the integration station 202 by the first final-work robot 214 which is arranged to accomplish both welding on the corresponding part and the transferring path of which is shown by arrow 214c, and by a sixth or relay robot 224 the transferring path of which is shown by arrow 224c. The relay robot 224 is provided with a parts holder 224b. A relay station 226 is disposed at one end of the transferring path 214c of the first final-work robot 214, and the relay robot 224 transfers the part transferred to the relay station 226 by the first final-work robot 214 to the integration station 202. The parts holder 216b of the second final-work robot 216 is detachable, and is removed from the robot 216 and placed on a temporary placing table 228 disposed along the transferring path 216c of the robot 216 while the robot 216 works on the parts at the final working station 205 of the second assembly line II. In this particular embodiment, the third final-work robot 218, which is adapted to swing as shown by arrow 218b, works on a part separately fed to a working station 230 from the human working region 10' while the second final-work robot 216 transfers the part to the integration station 202 from the final working station 205 of the second assembly line II.

In the automated working region 200 is provided an output line IV for carrying out the unit integrated on the integration station 202. The output line IV comprises a pair of rails 232 and a carriage 234 movable on the rails 232. Between the starting end of the output line IV and the integration station 202 is disposed a seventh robot 236 which is provided with both a welding gun 236a and a parts holder 236b. The parts holder 236b is detachable and is removed from the robot 236 and placed on a temporary placing table 238 disposed along the transferring path thereof while the robot 236 works at the integration station 202.

In this embodiment, a rear fender panel, a quarter panel a front pillar inner panel are used as the main parts and are integrated together and with sub parts such as a wheel house, a side sill, a center pillar, a roof rail and the like into a side portion of a vehicle body. The parts are stored in the parts feeding stations 11' in the human working region 10' and the parts are taken out from the parts feeding stations 11' to be manually assembled into first to third primary assemblies P1', P2' and P3' on the working stations 13 or by use of the welding machines 12. The primary assemblies P1' to P3' are manually delivered to the respective parts delivering stations Ia', IIa' and IIIa'. More particularly, the first primary assembly P1' is placed on the carriage 211 of the first assembly line I, the second primary assembly P2' is placed on the carriage 212 of the second assembly line II and the third primary assembly P3' is placed on the carriage 213 of the third assembly line III.

The first primary assembly P1' is transferred to the final working station 204 by the carriage 111 and is subjected to a predetermined process or welding by the first final-work robot 214. Then the first primary assembly P1' is transferred to the integration station 202 by the final-work robot 214 and the relay robot 224 via the relay station 226.

The second primary assembly P2' is transferred to the final working station 205 by the carriage 212 and is subjected to a predetermined process or welding by the second to fourth final-work robots 216, 218 and 220. Thereafter, the second primary assembly P2' is transferred to the integration station 202 by the second final-work robot 216. When transferring the second primary assembly P2', the second final-work robot 216 first moves to the temporary placing table 228 and brings the parts holder 216b thereof to the final working station 205 with the parts holder 216b attached to the arm of the robot 216. Then the second final-work robot 216 grips the second primary assembly P2' by way of the parts holder 216b and moves to the integration station 202. Then the second final-work robot 216 returns to the final working station 205, leaving the second primary assembly P2' at the integration station 202, and the parts holder 216b at the temporary placing table 228 on its way to the final working station 205. While the second final-work robot 216 transfers the second primary assembly P2' to the integration station 202, the third final-work robot 218 works on the part which is manually fed to the working station 230 and is to be attached to one of the main parts in the human working region 10'.

Further, the third primary assembly P3' is transferred to the final working station 206 by the carriage 213 and is subjected to a predetermined process or welding by the fifth final-work robot 222. Thereafter, the third primary assembly P3' is transferred to the integration station 202 by the fifth final-work robe 222.

The three primary assemblies P1', P2' and P3' are thus assembled in the respective assembly lines I, II and III, and transferred to the integration station 202 by way of the final-work robots 214, 216 and 222 and the relay robot 224. Then the three primary assemblies P1', P2' and P3' converged to the integration station 202 are integrated into a unit U', i.e., a side panel in this particular embodiment, by the fifth, seventh and second robots 222, 236 and 216. If necessary, the relay robot or the sixth robot 224 may be provided with a welding gun 224a to contribute to integration of the primary assemblies P1', P2' and P3' at the integration station 202. The completed side panel U' is placed on the carriage 234 of the output line IV by the seventh robot 236.

If desired, a stationary welding machine 240 may be provided along the transferring path 224c of the relay robot 224 to work on the first primary assembly P1' transferred to the integration station 202 by the relay robot 224. With this arrangement, the number of working steps to be done upstream of the final working station 204 of the first assembly line I can be reduced. Further, stationary welding machines 240a and 240b may be provided along the transferring path 241c of the first final-work robot 214 to work on the first primary assembly P1' transferred to the relay station 226 by the first final-work robot 214. Further, if desired, the first final-work robot 214 and the relay robot 224 may be arranged to work at the relay station 226.

In the embodiments shown in FIGS. 3 and 13, the whole working area is divided into the human working area 10 or 10' in which no robot works and the automated working area 20 or 200 in which no workman works, the parts feeding station 11 or 11' at which all the parts necessary for assembly of the desired unit are concentrated being disposed on one side of the human working area, a plurality of parallel assembly lines I, II and III along which solely robots work and no workman works being disposed in the automated working area so that the starting ends of the respective assembly lines face to the human working area, and the terminating ends of the respective assembly lines being operatively connected, by way of a robot or robots, to an integration station 21 or 202 at which the parts assembled in the respective assembly lines are integrated into the desired unit.

These features are advantageous in that, since the human working area is completely separated from the robot working area (automated working area), safety of the workmen can be ensured, and both the robots and the workmen can work with a high efficiency according to their respective properties and abilities, and that the working area can be compactly arranged by dividing an assembly line into a plurality of assembly lines. In the past, the assembly line for integrating a plurality of parts into a unit has comprised a long single assembly line along which both robots and workmen work and to which parts and sub assemblies are fed. The long single assembly line is disadvantageous for the following reasons.

First, when a large number of steps are required to assemble the desired unit, a very long assembly line becomes necessary and therefore the plant must have a vast area. Further, since the workmen and robots work in the same space, the workmen are always in danger, and in order to enlarge the spaces between the working stations at which robots work and those at which workmen work to ensure safety of the workmen, the area of the plant must be further enlarged. Further, since the workmen and the robots differ from each other in properties and abilities, their respective abilities cannot be efficiently manifested. For example, one of them must wait until the other finishes a particular operation.

I claim:

1. A method of assembling a plurality of parts into a unit, comprising the steps of:
    providing a plurality of single pivoted robots, each robot having a swinging locus and each robot having means for performing work on at least one of said parts and means for transferring said at least one part from one location to another location;
    arranging said single pivoted robots so that the swinging locus of each single pivoted robot intersects with that of at least one of the other single pivoted robots;
    providing a working station at the intersection of the swinging loci;
    causing at least one of the single pivoted robots whose swinging loci intersect to perform work on the part at the working station; and
    causing one of the single pivoted robots whose swinging loci intersect to transfer the part to the next station.

2. A method as defined in claim 1 in which said plurality of single pivoted robots include a first single pivoted robot, a second single pivoted robot and at least one third single pivoted robot, the swinging loci of the first to third single pivoted robots intersecting and a working station at the intersection therebetween forming an integration station at which parts transferred by the first to third single pivoted robots are integrated into a unit.

3. A method as defined in claim 2 further comprising a step of feeding the parts to the respective first to third single pivoted robots at first to third delivering stations which are disposed between a human working area and a robot working, no robot working in the human working area and no workman working in the robot working area.

4. A method as defined in claim 3 in which the parts are delivered to the third robot by way of a relay robot.

5. A method as defined in claim 1 in which said means for performing work on at least one of said parts is a welding gun.

6. A method as defined in claim 1 in which said means for transferring said at least one part is detachably mounted on the single pivoted robot and is placed on a temporary placing table disposed along the swinging locus of the robot while the robot performs work on at least one of said parts.

7. A method of integrating more than two parts respectively assembled in different lines comprising:
providing a single pivoted robot at the end of each of said lines, each said robot having a swinging path and each said robot having means for performing the last assembly steps in the respective line and means for transferring said respective part from one location to another location;
arranging said robots so that their swinging paths intersect;
providing an integration station at said intersection of said swinging paths of said robots;
directly transferring parts assembled by said two lines to said integration station, said robots transferring respective parts from the respective lines to said integration station;
providing a further line for the assembly of another part, said further line including a final robot having means for performing the last assembly step in said further line and having means for transferring said another part from one location to another location;
providing a relay robot intermediate said further line and said integration station, said relay robot having a transferring path and having means for transferring said another part along said transferring path from one location to another location;
transferring said another part from said further assembly line to said integration station, said relay robot receiving said another part from said final robot and transferring said another part to said integration station.

8. A method as defined in claim 7 further comprising providing a working station along said transferring path of said relay robot and processing said another part on said working station.

9. A method as defined in claim 7 wherein said lines are arranged substantially in parallel to each other, the starting ends of the lines facing a human working area in which no robot works, said lines being disposed in a robot working area in which no workman works, and the parts to be used in the respective lines being concentrated in a parts feeding station disposed on one side of the human working area.

10. A method of assembling a plurality of parts into a unit, comprising the steps of:
providing a plurality of single pivoted robots, each robot having a swinging locus and each robot having means for performing welding on at least one of said parts and means for transferring said at least one part from one location to another location;
arranging said single pivoted robots so that the swinging locus of each single pivoted robot intersects with that of at least one of the other single pivoted robots;
providing a working station at the intersection of the swinging loci;
causing at least one of the single pivoted robots whose swinging loci intersect to perform welding on the part at the working station; and
causing one of the single pivoted robots whose swinging loci intersect to transfer the part to the next station.

11. A method of integrating more than two parts respectively assembled in different lines comprising:
'providing a sinlge pivoted robot at the end of each of said lines, each said robot having a swinging path and each said robot having means for performing the last welding step in the respective line and means for transferring said respective part form one location to another location;
arranging said robots so that their swinging paths intersect;
providing an integration station at said intersection of said swinging paths of said robots;
directly transferring parts assembled by said two lines to said integration station, said robots transferring respective parts from the respective lines to said integration station;
providing a further line for the assembly of another part, said further line including a final robot having means for performing the last welding step in said further line and having means for transferring said another part from: one location to another location;
providing a relay robot intermediate said further line and said integration station, said relay robot having a transferring path and having means for transferring said another part along said transferfing path from one location to another location;
transferring said another part from said further assembly line to said integration station, said relay robot receiving said another part from said final robot and transferring said another part to said integration station.

12. A welding and assembling system for welding a plurality of parts to form a workpiece comprising a work station for receiving the workpiece, a parts holder for receiving and retaining the plurality of parts in respective predetermined positions, a temporary placing table adapted to support thereon the parts holder, and a robot having a welding gun and adapted to grip the parts holder to transfer it, the work station and the temporary placing table being disposed within the moving locus of the robot, said plurality of parts being loadable on the parts holder on the temporary placing table and being transferred to the work station together with the parts holder by the robot to be welded to form the workpiece on the work station by the robot.

13. A welding and assembly system as defined in claim 12 in which a pair of said parts holders are provided, a set of said plurality of parts is loaded onto one of the parts holders and while said one of the parts holders is transferred to the work station and the parts thereon are welded to form the workpiece, another set of said plurality of parts is loaded onto the other parts holder.

* * * * *